Oct. 23, 1956     H. K. BAILEY     2,767,704
MEDICAL THERMOMETER PROTECTOR AND HOLDER
Filed June 28, 1955
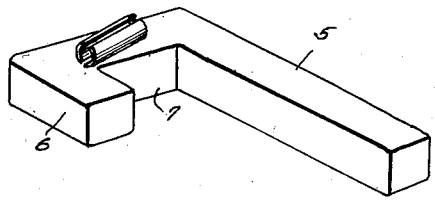
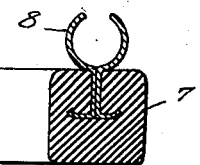
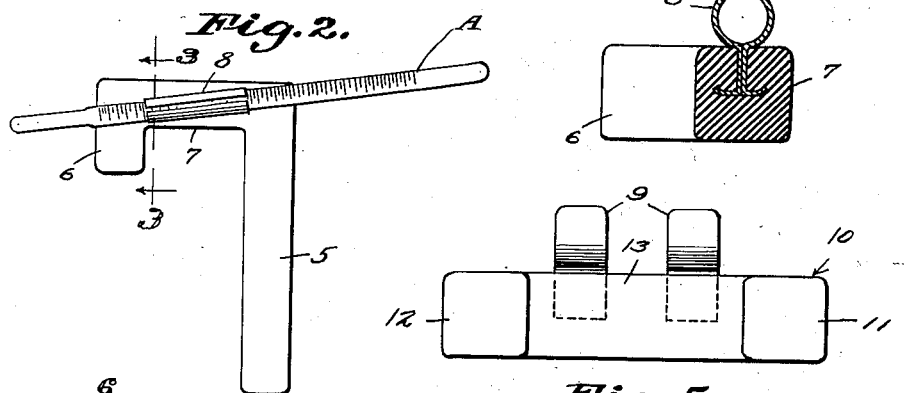
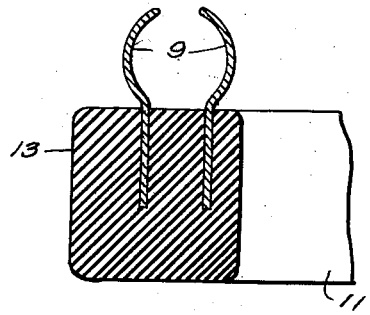
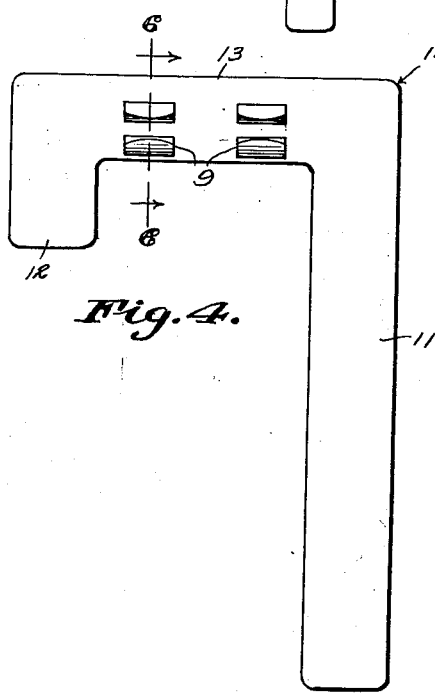
Henry K. Bailey
INVENTOR
BY
ATTORNEYS.

United States Patent Office 2,767,704
Patented Oct. 23, 1956

2,767,704

MEDICAL THERMOMETER PROTECTOR AND HOLDER

Henry K. Bailey, Lorain, Ohio

Application June 28, 1955, Serial No. 518,477

4 Claims. (Cl. 128—2)

This invention relates to a device designed for holding a medical thermometer in the mouth of a patient during the period while the temperature of the patient is being taken.

An important object of the invention is to provide a holder for a medical thermometer which will permit of the proper positioning of the thermometer in the mouth of the patient, the device also affording means for protecting the thermometer against being broken by the patient biting the thermometer.

A further object of the invention is to provide a holder or supporting means for a medical thermometer being so constructed that the thermometer may be positioned or removed from the patient's mouth without the necessity of the doctor or nurse touching the thermometer with the hands, thereby guarding against the thermometer being affected by the heat of the hands of the doctor or nurse.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a perspective view of a medical thermometer holder, constructed in accordance with the invention.

Figure 2 is a side elevational view thereof showing a thermometer as positioned within the holder.

Figure 3 is a sectional view taken substantially on line 3—3 of Figure 2.

Figure 4 is a side elevational view of a modified form of the invention.

Figure 5 is an end elevational view thereof.

Figure 6 is a sectional view taken on line 6—6 of Figure 4.

Referring to the drawing in detail, the device comprises a body portion which is substantially U-shaped in formation, with a leg 5 substantially longer than the leg 6 thereof.

The body portion is constructed of suitable heat resistant material such as plastic or hard rubber, to withstand the heat to which it will be subjected during sterilization.

The body portion also includes a connecting section 7 that connects legs 5 and 6, the connecting section providing a surface for the clamp 8, which is secured thereto, the clamp being designed to clamp and hold a thermometer, such as indicated by the reference character A in Figure 2 of the drawing.

The clamp 8 is so located with respect to the connection section 7 that it is slightly tilted so that when the thermometer is positioned therein, the thermometer will be supported and held in the proper inclined position to permit the thermometer to be positioned under the tongue of the patient whose temperature is being taken.

In the form of the invention as shown by Figure 4 of the drawing, clamps 9 are embedded in the plastic material of which the body portion 10 is constructed. In this form of the invention, the body portion is also substantially U-shaped and comprises a long leg 11 and a substantially short leg 12 connected by the integral connecting piece 13.

In the use of the device, the thermometer is held in the clamp of the device so that the end of the thermometer in which the mercury is contained is extended beyond the edge of the short leg of the holder so that it may be inserted under the tongue of the patient. The device is now hooked over the lower jaw of the patient, with the short leg of the holder lying within the mouth of the patient, with the long leg of the holder extending downwardly from the mouth of the patient. It will be noted that the connecting piece, section 7, is of a width so that the person whose temperature is being taken will bite the connecting section 7 should he attempt to close his teeth on the device, thereby protecting the thermometer against being broken by the patient biting the thermometer.

In view of the fact that the substantially long leg of the holder extends downwardly over the chin of the person whose temperature is being taken, it will be seen that this long leg of the holder affords effective means for positioning or removing the thermometer, eliminating any possibility of the thermometer being affected by the heat of the fingers of the person applying the thermometer.

Having thus described the invention what is claimed is:

1. A holder for holding a medical thermometer in the mouth of a patient, comprising a body including a short arm and a long arm, an integral connecting section between said arms providing a substantially U-shaped body, and clamps on said connecting section for clamping a medical thermometer to said body for positioning in the mouth of a patient.

2. A holder for holding a medical thermometer in the mouth of a patient, comprising a body including a pair of spaced arms, a member connecting said arms, said body adapted to hook over the lower jaw and teeth of a person supporting said holder within the mouth, and clips on said holder for clipping a medical thermometer to said holder.

3. A holder for holding a medical thermometer in the mouth of a patient, comprising a substantially U-shaped body constructed of yieldable heat resisting material, adapted to hook over the jaw and teeth of the mouth of a patient, clamps extending laterally from said body in which a medical thermometer is clamped and said body being substantially wider than said thermometer to receive the pressure of the patient's teeth should the patient attempt to bite the thermometer.

4. A holder for holding a medical thermometer in the mouth of a patient, comprising a substantially U-shaped body having a long arm and a short arm, said body adapted to hook over the teeth of the lower jaw of the mouth of the patient with the long arm extending downwardly over the chin of the patient, a clamp on said body for removably clamping a thermometer thereto, and said long arm providing a handle for effecting placement and removal of said holder and thermometer.

No references cited.